July 17, 1928.
M. H. PADE
1,677,868
APPARATUS FOR MANUFACTURING INNER TUBES
Filed Dec. 5, 1919
5 Sheets-Sheet 2
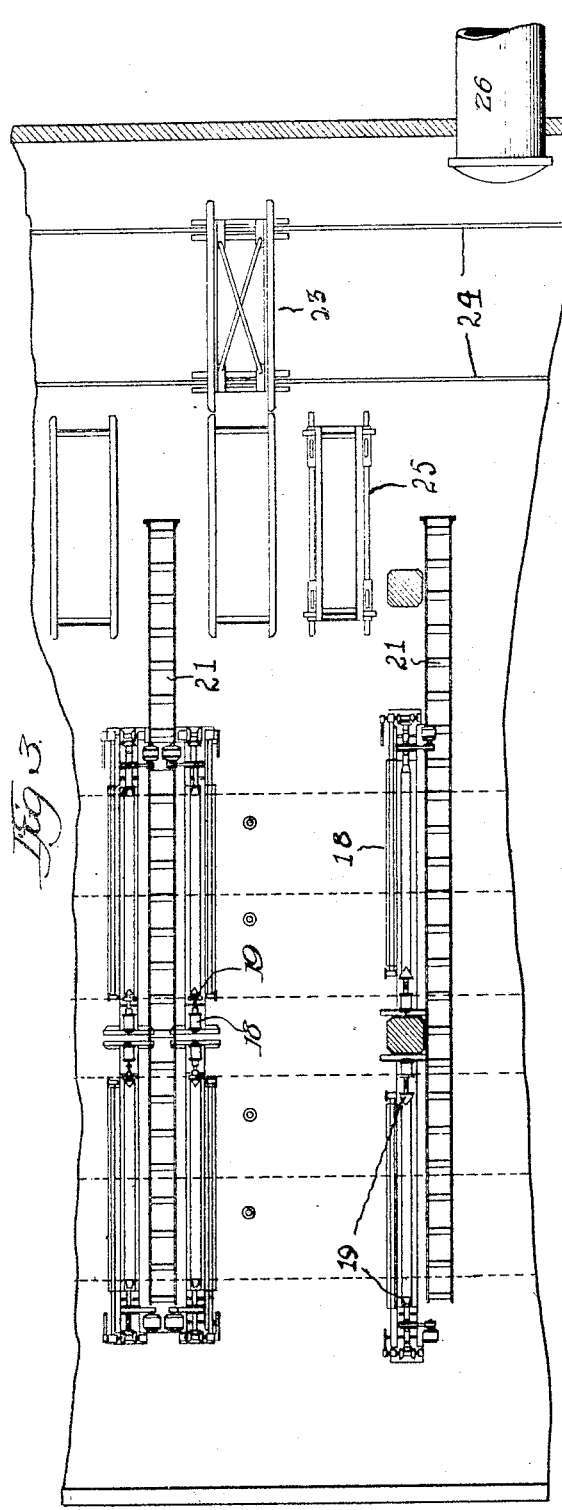
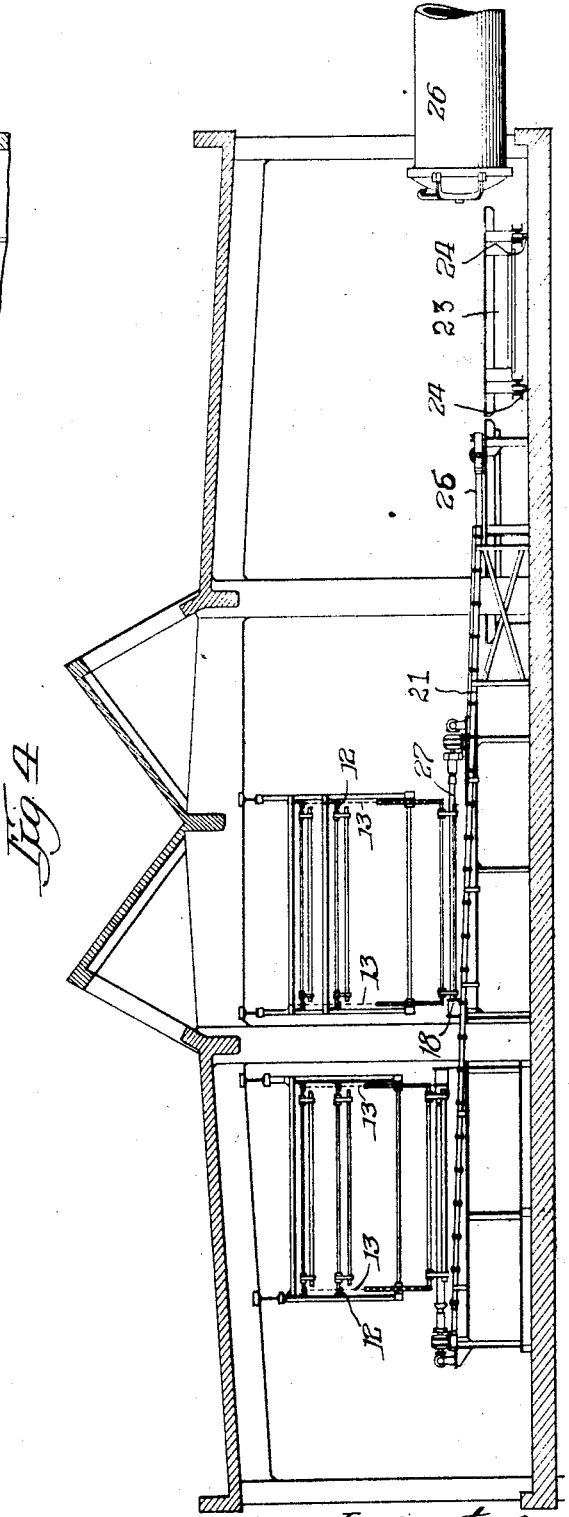

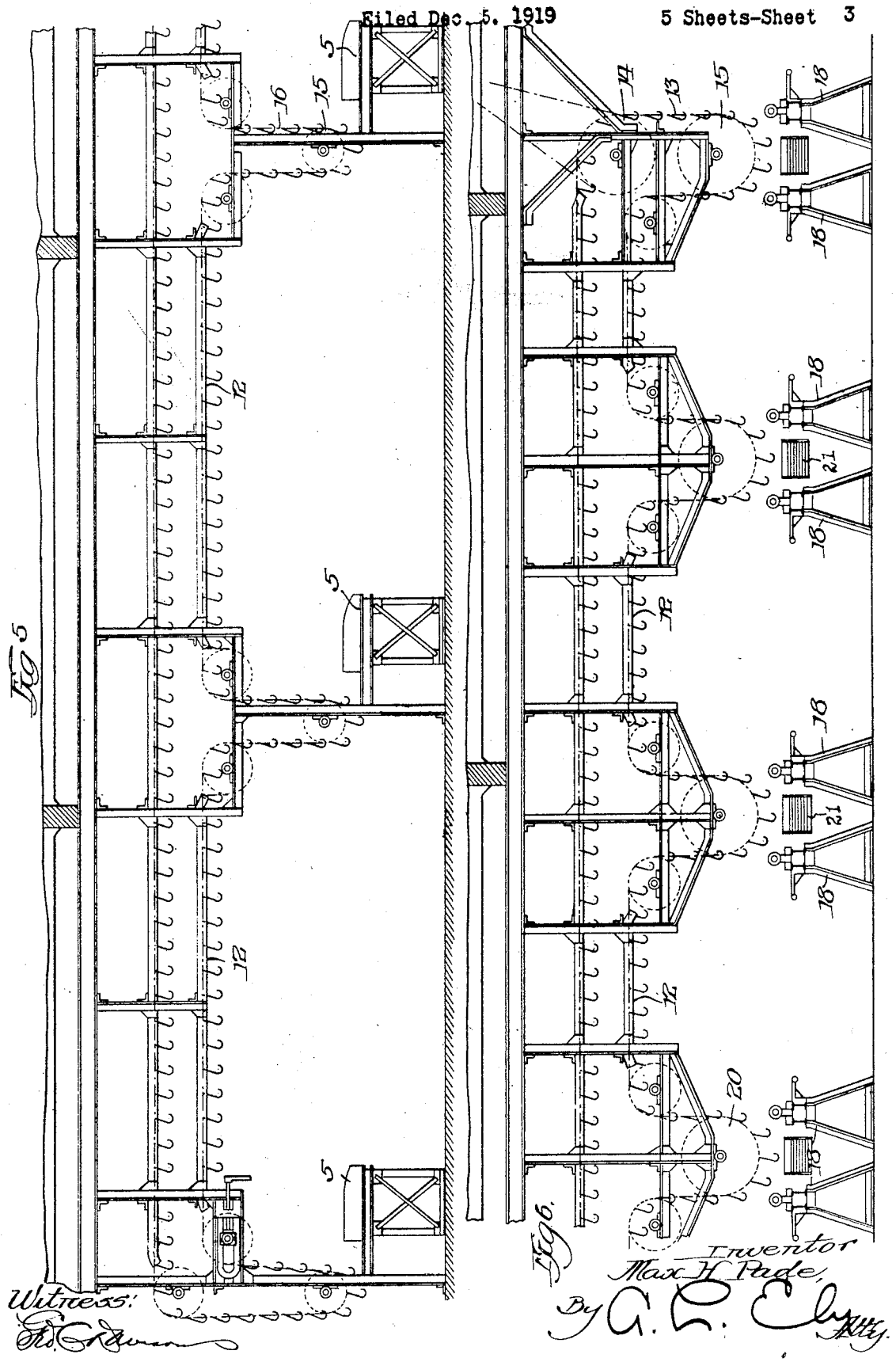

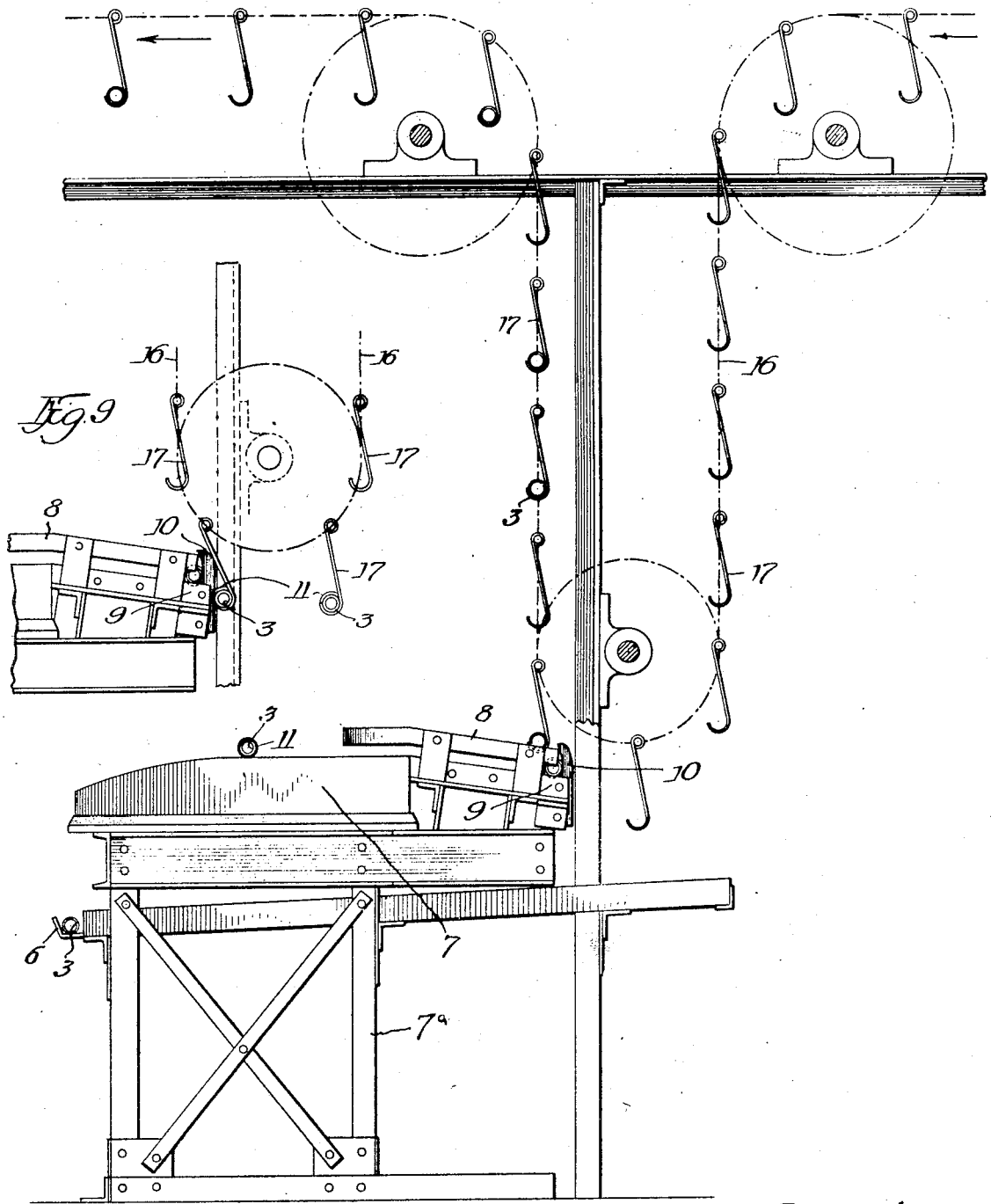

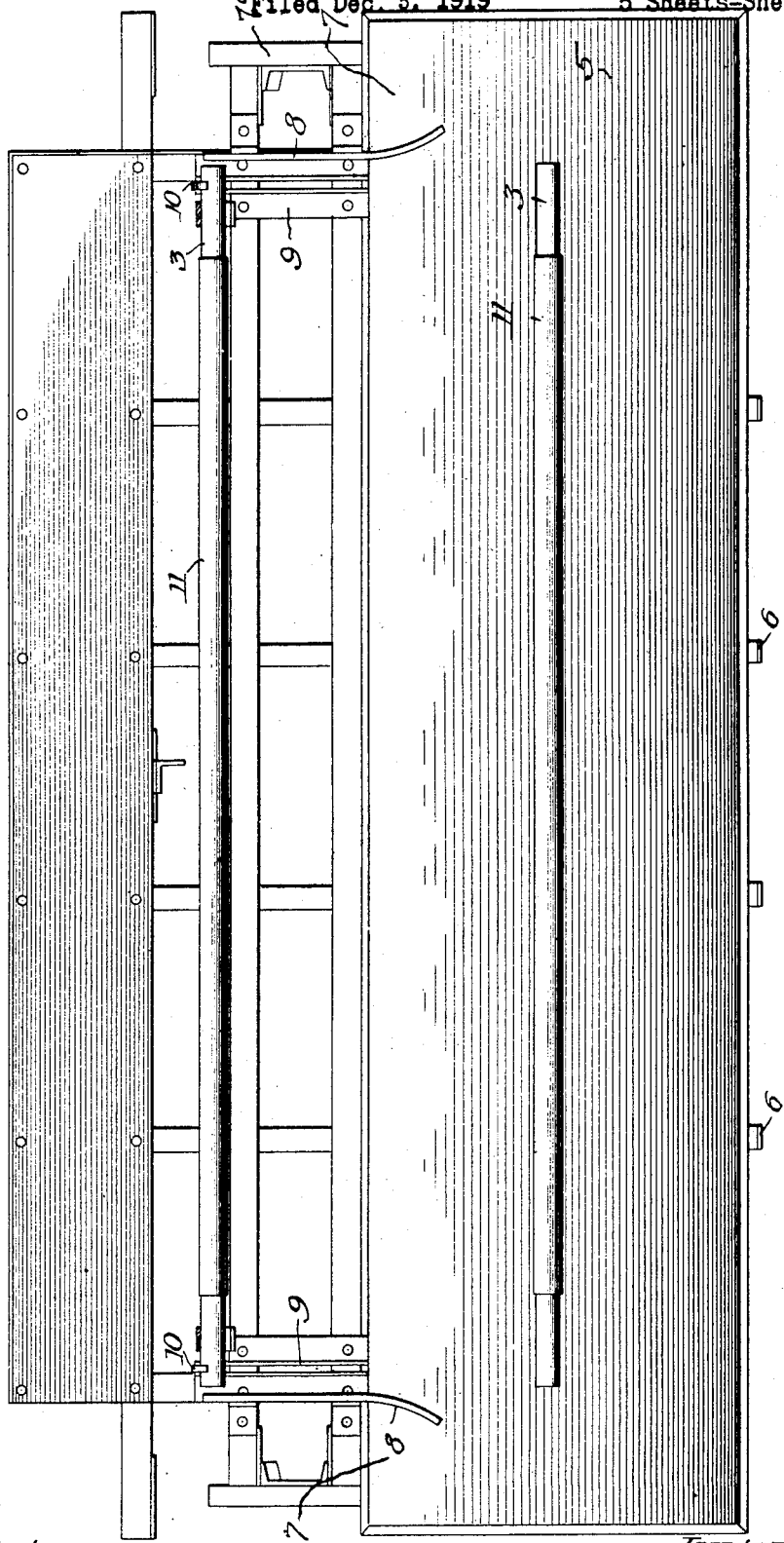

Patented July 17, 1928.

1,677,868

UNITED STATES PATENT OFFICE.

MAX H. PADE, OF AKRON, OHIO, ASSIGNOR TO THE FIRESTONE TIRE AND RUBBER COMPANY, OF AKRON, OHIO, A CORPORATION OF OHIO.

APPARATUS FOR MANUFACTURING INNER TUBES.

Application filed December 5, 1919. Serial No. 342,712.

This invention relates to an apparatus for use in the manufacture of inner tubes for automobile or motor cycle tires and has for its object the production of inner tubes more expeditiously and at less expense than has heretofore been possible. By means of the apparatus here shown, the maximum number of inner tubes may be produced with the least floor space and with the fewest number of operators. The tubes are handled the least number of times and are more rapidly put through the various steps in manufacture than by any method or machine heretofore in use.

These and other objects will be apparent as the description proceeds, it being understood that the drawings show one embodiment of the invention, but that it is capable of embodiment in many different forms.

In the drawings:

Fig. 1 is a plan view of the tube manufacturing apparatus taken at the point where the tubes are rolled.

Fig. 2 is a vertical section through the machinery at the point where Fig. 1 is taken.

Fig. 3 is a plan view of the apparatus at the wrapping point.

Fig. 4 is a vertical section of Fig. 3.

Fig. 5 is an elevation at the rolling tables.

Fig. 6 is an elevation at the wrapping lathes

Fig. 7 is an enlarged elevation at a tube rolling table.

Fig. 8 is a plan of the table.

Fig. 9 is an enlarged detail of the tube mandrel lifting and carrying hook at the pick-up-point.

It will be understood by those familiar with the art that an inner tube for a pneumatic tire is formed from a sheet of multiple ply calendered rubber sheeting which is cut to the proper length and width. The sheet of rubber may be formed into a tube in many ways, but the one shown herein is preferred, in which the sheet of rubber is laid upon a resilient table and rolled about a hollow steel mandrel, the sheet being of sufficient width to make two or more convolutions about the mandrel. The table which is preferably used, although other rolling mechanism may be substituted, is a canvas grooved pneumatic cushion, the upper surface of which forms a resilient even pressure cushion on which the rubber tube may be firmly and evenly rolled, eliminating all air pockets or unevenness in the formation of the tube.

The steel mandrel is then carried to a wrapping table or lathe in which it is mounted and firmly wrapped with a spiral cloth winding. From the wrapping lathe, the tube and mandrel are removed to a carriage or rack which, when full is run into a heater of any preferred type in which the vulcanization is effected. After vulcanization, the mandrel and tube are taken from the heater, the wrapping removed and the tube stripped and ready for splicing. The mandrel is returned to the rolling table and is ready for reuse. In the operation of the device a large number of mandrels are used and kept in circulation through the several operations.

The above outline gives a brief summary of the operation of manufacturing tubes and it is the puropse and object of this invention to combine the several elements required in the manufacture of the tubes with certain conveyors so that the operation is performed with as little loss of time and with the greatest saving of labor possible.

Referring now particularly to Figs. 1 and 2, 1 represents the tables on which the rubber sheeted stock is cut to the proper size, and 2 the tables upon which the prepared sheets are laid ready for the rolling operation.

A sheet of rubber taken from the table 2 is laid on the upper surface of the rolling table 5, and a mandrel, designated at 3 is taken from a convenient point, either a rack 6 or the return conveyor 4 placed along one edge of the sheet of rubber which is moistened with gasoline or other rubber solvent so that it will stick and then rolled up the table to form the tube.

The rolling table is shown in detail in Figs. 7 and 8 and comprises a frame work or standards 7ª, carrying at its forward side the storage rack 6, and on its upper surface a canvas top 7, beneath which is a pneumatic bag or cushion. The operator stands at the left of the table, as viewed in Fig. 7, and rolls the mandrel up the table picking up and winding the sheet rubber thereon in tube form. The mandrel is then rolled down the far side of the table and passes between two flared parallel side rails 8 on to a pair of supporting rails 9 until it meets stop 10.

tubes comprising a device whereon the tube is rolled about a mandrel, a guideway from said device along which the mandrels pass, a stop in said guideway, a conveyor intersecting said guideway, and swinging hooks on said conveyor adapted to pick up a mandrel at the stop, said stop being arranged to contact a mandrel on said conveyor and swing said hook backward.

2. An apparatus for the manufacture of tubes, comprising a resilient table upon which tubes may be rolled about mandrels, rails at the corners of said table adapted to support the mandrels, vertical bars at the ends of said rails forming stops against which the mandrel may come to rest, a conveyor and swinging hooks on said conveyor adapted to intersect the rail at the stop.

MAX H. PADE.

July 17, 1928.
W. H. PIERCE
FASTENER
Filed Nov. 18, 1924
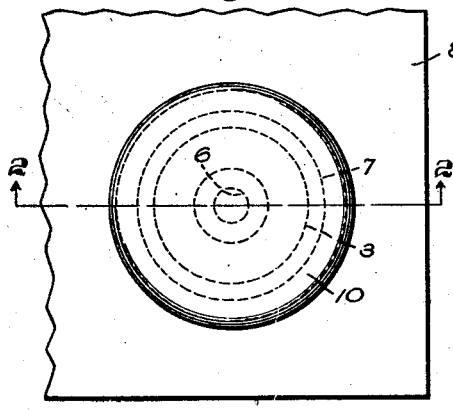
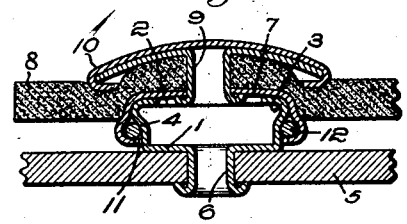
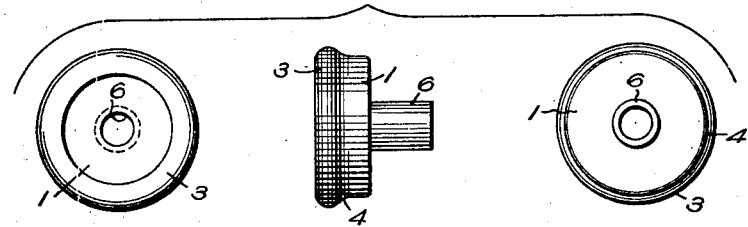
Inventor:
Walter H. Pierce,